(12) United States Patent
Liang et al.

(10) Patent No.: US 11,882,561 B2
(45) Date of Patent: Jan. 23, 2024

(54) CONTROL INFORMATION TRANSMISSION TECHNIQUES

(71) Applicant: ZTE Corporation, Guangdong (CN)

(72) Inventors: Chunli Liang, Guangdong (CN); Shuqiang Xia, Guangdong (CN); Xianghui Han, Guangdong (CN); Jing Shi, Guangdong (CN); Min Ren, Guangdong (CN); Wei Lin, Guangdong (CN)

(73) Assignee: ZTE Corporation, Guangdong (CN)

( * ) Notice: Subject to any disclaimer, the term of this patent is extended or adjusted under 35 U.S.C. 154(b) by 463 days.

(21) Appl. No.: 17/170,219

(22) Filed: Feb. 8, 2021

(65) Prior Publication Data
US 2021/0168842 A1    Jun. 3, 2021

Related U.S. Application Data

(63) Continuation of application No. PCT/CN2018/100004, filed on Aug. 10, 2018.

(51) Int. Cl.
| H04W 72/21 | (2023.01) |
| H04L 1/08 | (2006.01) |
| H04W 72/0446 | (2023.01) |
| H04W 72/1268 | (2023.01) |

(52) U.S. Cl.
CPC ............ *H04W 72/21* (2023.01); *H04L 1/08* (2013.01); *H04W 72/0446* (2013.01); *H04W 72/1268* (2013.01)

(58) Field of Classification Search
CPC ............ H04W 72/21; H04W 72/0446; H04W 72/1268; H04L 1/08

USPC ........................................................ 455/450
See application file for complete search history.

(56) References Cited

U.S. PATENT DOCUMENTS

| 9,055,469 | B2 | 6/2015 | Xu et al. |
| 10,530,528 | B2 | 1/2020 | Park et al. |
| 2016/0309510 | A1 | 10/2016 | Wong et al. |
| 2018/0092105 | A1 | 3/2018 | Lee et al. |
| 2018/0132264 | A1 | 5/2018 | Jung et al. |

(Continued)

FOREIGN PATENT DOCUMENTS

| CN | 1298262 A | 6/2001 |
| CN | 102790948 A | 11/2012 |

(Continued)

OTHER PUBLICATIONS

Co-Pending European Patent Application No. 18929640.3, Intention to Grant dated Apr. 26, 2023, 9 pages.

(Continued)

*Primary Examiner* — Joel Ajayi
(74) *Attorney, Agent, or Firm* — Perkins Coie LLP

(57) ABSTRACT

A method of wireless communication includes receiving, at a communication device, an interrupt indication indicating an interruption to occur on a first transmission resource, interrupting, based on the interrupt indication, a transmission scheduled to occur using a second transmission resource on a channel, where the first transmission resource and the second transmission resource at least partially overlap, and transmitting, in case that the transmission included a control information, the control information, using a third transmission resource.

12 Claims, 9 Drawing Sheets

(56) References Cited

U.S. PATENT DOCUMENTS

| | | | | |
|---|---|---|---|---|
| 2018/0191470 A1* | 7/2018 | Manolakos | ........... | H04W 72/12 |
| 2019/0199477 A1 | 6/2019 | Park et al. | | |

FOREIGN PATENT DOCUMENTS

| | | | |
|---|---|---|---|
| CN | 102934384 | | 2/2013 |
| CN | 106105084 | | 11/2016 |
| CN | 106470425 | A | 3/2017 |
| EP | 1104212 | A2 | 5/2001 |
| EP | 3780841 | A1 | 2/2021 |
| WO | 2018019085 | A1 | 2/2018 |
| WO | 2018143740 | A1 | 8/2018 |

OTHER PUBLICATIONS

Co-Pending Chinese Patent Application No. 2018800965504, Notification to Complete Formalities of Registration dated Nov. 18, 2022, 4 pages with unofficial translation.

Co-Pending European Patent Application No. 18929640.3, Communication pursuant to Article 94(3) dated Feb. 3, 2023, 4 pages.

Co-Pending Indian Patent Application No. 202147006310, First Examination Report dated Mar. 2, 2023, 7 pages.

Extended European Search Report in EP Patent Application No. 18929640.3, dated Aug. 17, 2021, 10 pages.

Huawei et al: "On pre-emption indication for DL multiplexing of URLLC and eMBB", 3GPP Draft; R1-1717081, 3rd Generation Partnership Project (3GPP), Mobile Competence Centre; 650, Route Des Lucioles ; F-06921 Sophia-Antipolis Cedex; France vol. RAN WG1, no. Prague, Czech Republic; Oct. 9, 2017-Oct. 13, 2017 Oct. 8, 2017 (Oct. 8, 2017), XP051340272, Retrieved from the Internet: URL:http://www.3gpp.org/ftp/Meetings_3GPP_SYNC/RAN1/Docs/ [retrieved on Oct. 8, 2017].

Co-Pending Chinese Patent Application No. 2018800965504, Office Action dated May 7, 2022, 24 pages with unofficial translation.

Zte, et.al. "UL multiplexing of transmissions with different reliability requirements," 3GPP TSG RAN WG1 Meeting #92bis R1-1803803, 6 pages.

International Search Report and Written Opinion in International Application No. PCT/CN2018/100004, dated May 8, 2019, 8 pages.

Co-Pending Korean Patent Application No. 10-2021-7007012, Office Action dated Oct. 24, 2023, pages with unofficial English Summary.

Vivo "Discussion on handling UL multiplexing of transmissions with different reliability requirements" 3GPP TSG RAN WG1 Meeting #92 R1-1801550, Athens, Greece, Feb. 26-Mar. 2, 2018.

\* cited by examiner

CONTROL INFORMATION TRANSMISSION TECHNIQUES

CROSS REFERENCE TO RELATED APPLICATIONS

This patent document is a continuation of and claims benefit of priority to International Patent Application No. PCT/CN2018/100004, filed on Aug. 10, 2018. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for transmitting control information that whose original transmission was pre-empted or interrupted. In one example aspect, the transmission of control information may use different transmission resources than the original transmission, the difference being either in the time domain, or in the frequency domain, or both.

In one example aspect, a method of wireless communication is disclosed. The method includes receiving, at a communication device, an interrupt indication indicating an interruption to occur on a transmission resource, interrupting, based on the interrupt indication, a transmission scheduled to occur using another transmission resource on a channel, where the transmission resource and the another transmission resource at least partially overlap, and transmitting, in case that the transmission included a control information, the control information, using yet another transmission resource.

In another aspect, another example method of wireless communication is disclosed. The method includes scheduling, from a network device, a first transmission to occur using some transmission resource on a shared channel, and transmitting, from the network device, after the scheduling, an indication that the first transmission is to be interrupted by a second transmission.

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
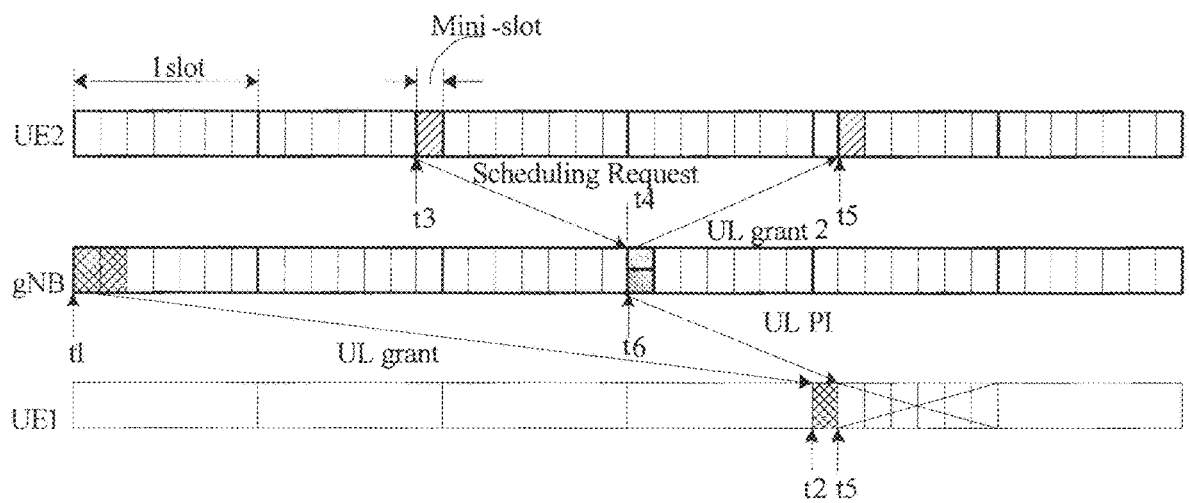
FIG. 1 depicts an example timeline of message transmissions.

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

When uplink services with different priorities in the communication system are transmitted, services with lower reliability may be preempted by resources with higher reliability, or services which can tolerate longer transmission delays may be preempted by services that have shorter latency requirements. A higher priority service may preempt the transmission resources of a lower priority service. When the preempted transmission includes an uplink control information, such as the hybrid automatic repeat request acknowledgement (HARQ-ACK) information and the important CSI (channel state information) corresponding to the PDSCH (physical downlink shared channel), how to reduce the loss of the uplink control information caused by the preemption of the transmission is not currently addressed.

With evolution of the 4th generation mobile communication technology (4G, 4th Generation mobile communication technology) Long Term Evolution (LTE), Long-Term Evolution (LTE-Advance/LTE-A, Long-Term Evolution Advance) to the fifth generation (5G, 5th Generation mobile communication technology), the demand for wireless bandwidth and quality of service is increasing. From the current development trend, both 4G and 5G systems are studying new features for supporting enhanced mobile broadband, ultra-high reliability, ultra-low latency transmission, and massive connectivity.

In order to support of ultra-high reliability and ultra-low latency transmission, low-latency and high-reliability services should be transmitted with a short latency or transmission delay, and at the same time, other services with longer transmission times or delay tolerance, that have not been transmitted or are being transmitted, may be preempted. By preemption, some of the transmission resources may be transferred from the high latency traffic to low latency traffic. Because which transmission is preempted may not clear between different user devices of the uplink transmission, in order to minimize the performance impact on the service with high reliability and low latency, the preemption indication information should be notified to the preempted transmission user, and the transmission time of such a transmission is delayed longer. Without coordination, it is possible that an isolated service or an uplink transmission with a lower reliability service may transmit on the same resource with another uplink transmission with low latency and high reliability, resulting interference to each other. And then the performance of service with higher reliability cannot be guaranteed. The present document describes techniques and embodiments that solve the above-discussed problem, and others.

Currently, for the downlink service preemptive transmission, 14 blocks are divided by {M, N}={14, 1} or {7, 2} in the configured reference downlink resources, and each block is notified in a bitmap manner. Whether it is preempted is signaled for this block, where M represents the number of partitions in the time domain division, and N represents the number of partitions divided in the frequency domain. However, how to determine the uplink reference resource for the uplink preemptive transmission and how to notify the uplink preemptive transmission is based on the preemption indication is not known. When the user equipment (UE: User Equipment) receives the preemption indication information, it is expected to interrupt or cancel the uplink transmission that it is transmitting or about to transmit. When the uplink transmission information is interrupted or cancelled, the uplink control information, such as the HARQ-ACK information corresponding to the physical downlink shared channel PDSCH, and the more important channel state information (CSI) related to the downlink scheduling may not be transmitted. The downside impact could be relatively large. The techniques described in the present document may be embodied in the form of base stations or user devices (e.g., UE) that can solve the above-described problems, and others.

As for the candidate solutions for the uplink preemption or interruption indication (UL PI), two options are considered.

Option 1: the UL PI indicates an reference uplink resource that the UE who receives this UL PI should not transmit on.

Option 2: the UL PI indicates the UE to stop or cancel transmission.

Figure 10:
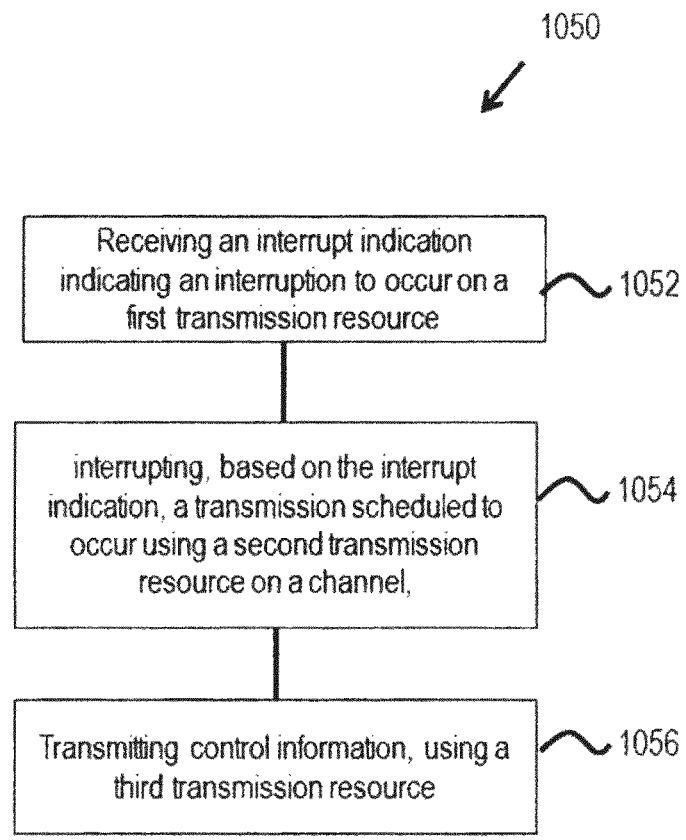
FIG. 10 is a flowchart for an example method of wireless communication.

Referring to FIG. 10, a flowchart for an example method 1050 of wireless communication is shown. The method 1050 may be implemented by a communication device such as a user device or UE. The method 1050 includes receiving (1502), at a communication device, an interrupt indication indicating an interruption to occur on a transmission resource, interrupting (1054), based on the interrupt indication, a transmission scheduled to occur using another transmission resource on a channel, where the transmission resource for which the interrupt is indicated and the other transmission resource at least partially overlap, and transmitting (1056), in case that the transmission included a control information, the control information, using a third transmission resource.

In some embodiments, the interrupting (1504) operation may include interrupting transmissions on symbols on an overlap between the first transmission resource and the second transmission resource. Alternatively, interrupting may include interrupting transmissions on the channel starting from a first symbol of the overlap between the first transmission resource and the second transmission resource. The overlap may be countable in terms of number of resource elements (REs) which represent time-frequency units used by transmissions.

In some embodiments, the transmitting (1506) operation may be performed on one or more symbols after the interruption. The transmitting operation may only be performed in case that the interruption caused non-transmission of some control. In some embodiments, the transmitting is performed on a shared channel or a control channel, and wherein the third transmission resource comprises a transmission slot of the interruption. In some embodiments, the transmitting is performed on a shared channel or a control channel, and wherein the third transmission resource comprises a transmission slot after the interruption.

In some embodiments, the third transmission resource corresponds to the resource of another transmission that is scheduled for the communication device on the shared channel in a next slot after the interruption. In some embodiments, the third transmission resource corresponds to the resource of the retransmission of the interrupted transmission that occurs in an immediately next slot after the interruption. In some embodiments, the third transmission resource corresponds to the resource of the retransmission of the interrupted transmission that is scheduled based on a new transmission grant. In some embodiments, the third transmission resource comprises a symbol K positions after a symbol comprising the interruption, wherein K is a positive integer. In some embodiments, the third transmission resource corresponds to a resource of a control channel that occurs in a slot of the interruption. In some embodiments, the third transmission resource corresponds to a resource of a control channel that occurs in a slot after the interruption. In some embodiments, the third transmission resource corresponds to a resource of a physical uplink shared channel or a physical uplink control channel.

In some embodiments, the method 1050 may further include, in case that there is a scheduled transmission of the shared channel in a next slot, then the third transmission resource corresponds to the resource of that scheduled transmission, and otherwise, the third transmission resource corresponds to the resource of retransmission of the interrupted transmission that occurs in the immediately next slot after the interruption.

In some embodiments, the method 1050 may further include in case that there is a scheduled transmission of the shared channel in a next slot, then the third transmission resource corresponds to the resource of that scheduled transmission, or in case that the scheduled transmission of the shared channel is absent in the next slot, and a control channel is available in the next slot, the third transmission resource corresponds to the resource of that control channel, or otherwise, the third transmission resource corresponds to the resource of a predefined control channel in the next slot. Here, the third transmission resource correspond to the resource of a control channel in a slot of the interruption, and the method 1050 may further include in case that the resource of the original control channel intended for the uplink control information is non-overlapping with the second transmission resource, the third transmission resource corresponds the resource of that control channel, and otherwise, the third transmission resource corresponds to the resource of a predefined control channel in the slot of the interruption.

In some embodiments, the predefined control channel is determined according to a resource indicator control field in a downlink control information of the downlink shared channel for which the uplink control information is intended. In some embodiments, the predefined control channel comprises a dedicated control channel resource configured by a higher layer. In some embodiments, the predefined control channel is determined based on the interrupt indication. In some embodiments, the predefined control channel is determined from an index of the control channel element for a downlink control channel carrying the interrupt indication, and an index for the communication device to find its corresponding interrupt indication in the downlink control information.

In some embodiments, when there is another uplink control information to be transmitted on the third transmission resource, then these two uplink control information bits are combined (e.g., concatenated or multiplexed) before transmitting.

In the method 1050, as further described in example embodiments below, in case that the interrupting includes interrupting transmissions on symbols on overlapping between the first transmission resource and the second transmission resource, then the transmitting includes resuming the transmission on one or more symbols temporally after the interruption. The channel may be a physical uplink shared channel, and wherein the physical uplink shared channel includes at least one demodulation reference signal symbol occurring temporally after the interruption. Different forms of the control information may include uplink control information such as HARQ-ACK or a periodic channel state information signal.

Figure 11:
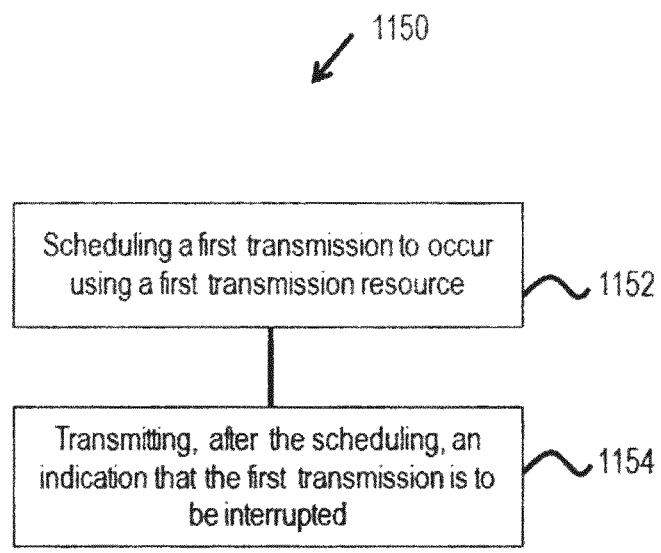
FIG. 11 is a flowchart for another example method of wireless communication.

Referring to FIG. 11, a flowchart for an example method 1150 of wireless communication is shown. The method 1150 may be implemented by a network device such as a base station and may be used for coordinating prioritized traffic on a physical uplink shared or physical uplink control channel by preempting certain shared or control channel transmissions. The method 1150 includes scheduling (1152), from a network device, a first transmission to occur using a specified transmission resource on a shared channel, and transmitting (1154), from the network device, after the scheduling, an indication that the first transmission is to be interrupted by a second transmission.

In some embodiments, the second transmission is a higher priority transmission compared to the first transmission. For example, the network may allow a low latency requirement packet to transmit ahead of a high latency packet. In some embodiments, the two transmissions may be for different user devices.

As with the method 1050, the method 1150 may also schedule transmission resources on a physical uplink control channel. As further described herein, the interruption may be sent to a group of user devices.

In some embodiments, another method of wireless communication may include receiving, at a communication device, an interrupt indication indicating an interruption to occur on a first transmission resource, interrupting, based on the interrupt indication, a transmission scheduled to occur using a second transmission resource on a channel, where the first transmission resource and the second transmission resource at least partially overlap, and where the schedule transmission includes a control information, and transmitting the control information using a third transmission resource.

Various features and examples of the above-described methods, including methods 1050 and 1150 are now described using a number of example embodiments.

Embodiment Example 1

An example embodiment is described in conjunction with FIG. 1.

According to Embodiment 1, when a UE received an uplink preemption indicator (UL PI), it should stop or cancel its PUSCH transmission. And if there is UCI multiplexed on the PUSCH, the UCI may be transmitted in a transmission resource different from the above mentioned PUSCH.

The "different transmission resource" includes: different in time domain, or different in frequency domain, or both. Further, the "different transmission resource" may be a PUSCH or a physical uplink control channel (PUCCH).

As shown in FIG. 1, the base station (gNB) sends an uplink grant (UL grant 1) to the UE1 at time t1 The UL grant 1 is configured to schedule the UE1 to perform a physical uplink shared channel (PUSCH) transmission at time t2. The PUSCH transmitted at time t2 includes HARQ-ACK information corresponding to the physical downlink shared channel (PDSCH). The PUSCH of the UE1 occupies a corresponding time slot.

Meanwhile, UE2 send a scheduling request (SR) as an uplink transmission to the base station at t3 time. The base station receives the request and sends to the UE2 authorization (the UL grant 2) to send the transmission at the t4 time. UE2 uses this authorization at time t5 to perform a PUSCH transmission. The PUSCH transmission from UE2 may overlap with the PUSCH transmission from UE1 in frequency domain, the overlap includes partial overlap or complete overlap.

Further in FIG. 1, the base station transmits an uplink preemption indicator (UL PI) to UE1 at time t6 (where t6 is not earlier than t3), instructing UE1 to stop or cancel its transmission no later than t5. The interruption (or preemption) is such that UE1 stops all transmissions on these resources starting from time t5.

Denote T as the time interval between time of UL PI transmitted and the time for the UE to stop or cancel its PUSCH transmission, more specifically, the time interval between the time of the last symbol of the corresponding PDCCH (physical downlink control channel) carrying the UL PI and the time of first symbol for the UE to stop or cancel its PUSCH transmission or the time of reference uplink resource which the UL PI intended for. In one form of the UL PI, it indicates the UE a reference uplink resource in which the UE should not transmit. The T should satisfy at least one of the following conditions:

(A) $T<=N_2$
(B) $T<=N_2-T_{T4}$
(C) $T>=T_{PI}$
(D) $T>=T_{PI}+T_{P\_off}$

Here, $N_2$ corresponds to a PUSCH preparation time for the low latency UE PUSCH processing capability 2, $T_{T4}$ is the timing adjustment for the UE or the maximum timing adjustment among a group of UEs the UL PI intended for, $T_{PI}$ is the for UL PI processing, and $T_{P\_off}$ is the time for UE to power off its uplink transmission.

When the UE1 interrupts the transmission, if the interrupted transmission contains uplink control information (UCI) such as the HARQ-ACK information corresponding to the PDSCH, in order to minimize the impact on the PDSCH transmission, UE should consider how to resend the lost HARQ-ACK information. For the purposes of description, the interrupt transmission PUSCH is called "Dropped PUSCH" and is assumed to be in the time slot N. For uplink control information (such as HARQ-ACK) contained in dropped PUSCH, the UE can send it in one of the following ways:

Embodiment Example 1-1

Figure 2:
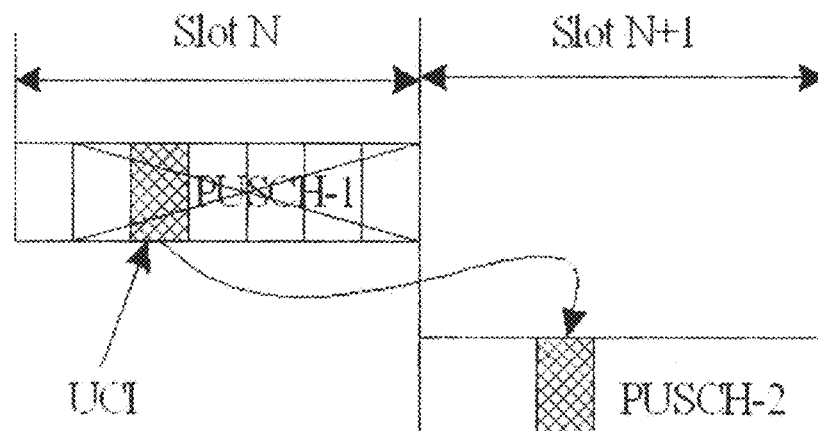
FIG. 2 depicts an example of a transmission of a pre-empted transmission.

As shown in FIG. 2, there is a PUSCH to be transmitted in slot N+1, which is just following the dropped (preempted) PUSCH in slot N. In order to distinguish this PUSCH from the dropped PUSCH, the PUSCH in slot N+1 is called PUSCH-2. In this embodiment, the HARQ-ACK information that would have been sent on the dropped PUSCH is sent on the PUSCH-2.

Further, when the PUSCH-2 also contains another HARQ-ACK information, the HARQ-ACK information carried on the dropped PUSCH is combined with the HARQ-ACK information carried on the PUSCH-2, and is jointly encoded and then sent on the PUSCH-2.

Embodiment Example 1-2

Figure 3:
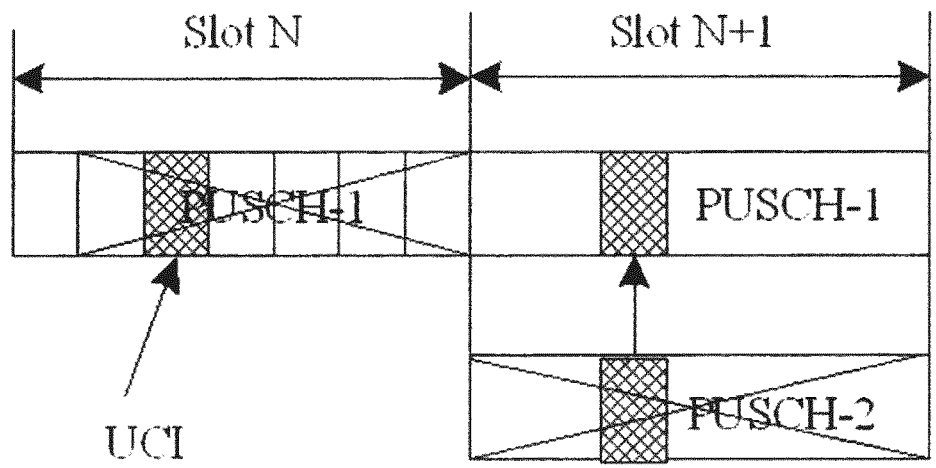
FIG. 3 depicts another example of a transmission of a preempted transmission.

As shown in FIG. 3, UE1 drops the PUSCH-1 in slot N and actually transmits the PUSCH-1 in slot N+1 instead. When there is a PUSCH-2 to be transmitted in slot N+1, PUSCH-2 would be dropped.

Further, when the PUSCH-2 to be transmitted in slot N+1 also contains HARQ-ACK information, the HARQ-ACK information contained in the PUSCH-2 is concatenated with HARQ-ACK information contained in the PUSCH-1, and is jointly encoded and then transmitted on PUSCH-1 in slot N+1 as a retransmission (or an actual transmission) of the above mentioned dropped PUSCH-1. That is, in this case, the priority of the previous transmission (PUSCH-1) is higher than the later transmission (PUSCH-2).

Accordingly, in this embodiment, the second (or next) PUSCH is a PUSCH to be transmitted in a slot followed by the first PUSCH transmission and the second PUSCH is a retransmission of the first PUSCH transmission. That is, the first and second PUSCHs are corresponding to the same transport block (TB) and the resource allocation for the second PUSCH is the same as the first PUSCH (of course, first PUSCH did not get transmitted successfully).

Embodiment Example 1-3

If there is another PUSCH to be sent in slot N+1 following the dropped PUSCH (to be distinguished from the dropped PUSCH, referred to herein as PUSCH-2), the UE1 puts the HARQ-ACK information originally transmitted on the dropped PUSCH and transmits on the PUSCH-2. When the PUSCH-2 also includes the HARQ-ACK information, the HARQ-ACK information carried on the dropped PUSCH and the HARQ-ACK carried on the PUSCH-2 are concatenated and jointly encoded and then transmitted on PUSCH-2.

Otherwise, when there is no PUSCH to be transmitted in slot N+1 following the dropped PUSCH, the UE1 retransmits (or actually transmits) the PUSCH in slot N+1 of the dropped PUSCH.

Embodiment Example 1-4

Figure 4:
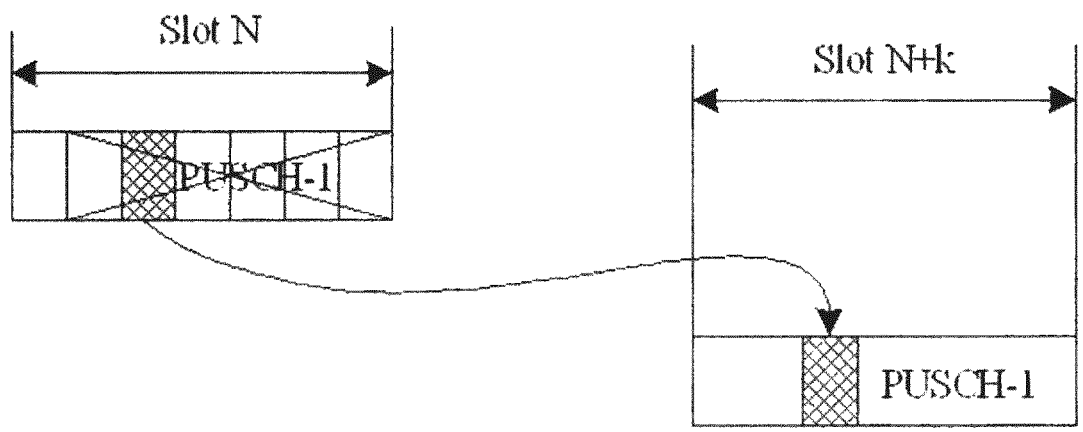
FIG. 4 depicts another example of a transmission of a preempted transmission.

As shown in FIG. 4, when the interrupt indication information (UL PI) is implicitly indicated by the new uplink grant information, that is, UE1 receives an uplink grant information for itself no earlier than t3, UE1 stops or interrupts the originally scheduled PUSCH transmission at time t2 (or no later than time t5, as illustrated in FIG. 1), then transmits the PUSCH in slot N+k as indicated in the new uplink grant information. Here, the PUSCH transmission contains the original HARQ-ACK information. Here, k is a positive integer k>=0. In various embodiments, k may be counted based slot or symbol.

Embodiment Example 1-5

In this example, UE1 transmits on the PUCCH in slot N+1 following the dropped PUSCH.

Further, when there is a PUCCH to be transmitted in slot N+1, the UE1 multiplexes all the UCIs including the HARQ-ACK information on the dropped PUSCH and the uplink control information to be sent in slot N+1 on the above said PUCCH. The multiplexing may be performed, for example, when UCIs of different types are being combined into the PUCCH transmission.

Further, when there is no PUCCH to be transmitted in slot N+1, the UE1 uses a predefined PUCCH resource to send the HARQ-ACK information on the dropped PUSCH, and the predefined PUCCH resource may be determined by one of the following manners.

(A) Determined according to a PRI (PUCCH Resource Indicator) control field in a DCI of a PDSCH corresponding to the HARQ-ACK.

(B) The PUCCH is a dedicated PUCCH resource configured by higher layer.

(C) The PUCCH resource is determined explicitly or implicitly according to the interrupt indication (UL PI) information. When it is an explicit indication, the PUCCH is determined based on the PRI control field contained in the interrupt indication information; when it is an implicit indication, the PUCCH is determined based on combination of an index of the first CCE (control channel element) for the PDCCH carrying the interrupt indication (UL PI) and an index for the UE1 to find its corresponding interrupt indication (UL PI) in the DCI (Downlink Control Information).

Figure 5:
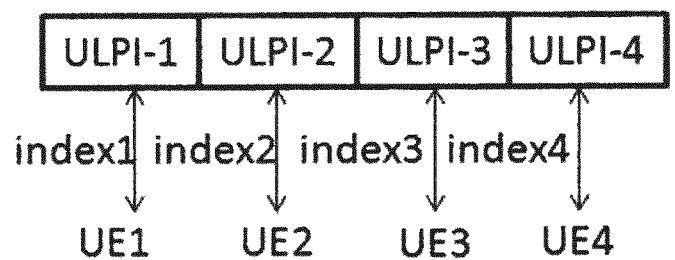
FIG. 5 depicts an example of an indication of uplink preemption indicator (UL PI) to a group of user terminals.

Further, for the manner of implicit determination, it is assumed that the interrupt indication information is a group-common DCI. That is, the interrupt indication (UL PI) information of multiple UEs constitutes one DCI, and each UE corresponds to one of the control field in the DCI, which is illustrated in FIG. 5. As depicted in FIG. 5, four UL PI are indicated, corresponding to four UEs, UE1 to UE4. Each UE searches for the corresponding interrupt indication information (UL PI) in the DCI according to the index information configured by the higher layer.

Embodiment Example 1-6

If there is another PUSCH is to be sent in slot N+1 following the dropped PUSCH (to be distinguished from the dropped PUSCH, referred to herein as PUSCH-2), the UE1 puts the HARQ-ACK information that was supposed to be originally transmitted on the dropped PUSCH to be actually transmitted on the PUSCH-2. When the PUSCH-2 also includes the HARQ-ACK information, the HARQ-ACK information carried on the dropped PUSCH and the HARQ-ACK carried on the PUSCH-2 are concatenated, jointly encoded and then transmitted on PUSCH-2.

Alternatively, if there is a PUCCH is to be transmitted in slot N+1 following the dropped PUSCH, the UE1 multiplexes all the UCIs including the HARQ-ACK information on the dropped PUSCH and the uplink control information to be sent in slot N+1 on the above said PUCCH.

Alternatively, when there is neither a PUSCH nor a PUCCH to be transmitted on the slot N+1 following the dropped PUSCH, the UE1 retransmits an actual transmission of the PUSCH in the next slot N+1 of the dropped PUSCH, or the UE transmits the HARQ-ACK of the dropped PUSCH on the predefined PUCCH resource. The predefined PUCCH resource can be determined in the same way as provided in Example 1-5, and is not repeated here.

Embodiment Example 1-7

Figure 6:
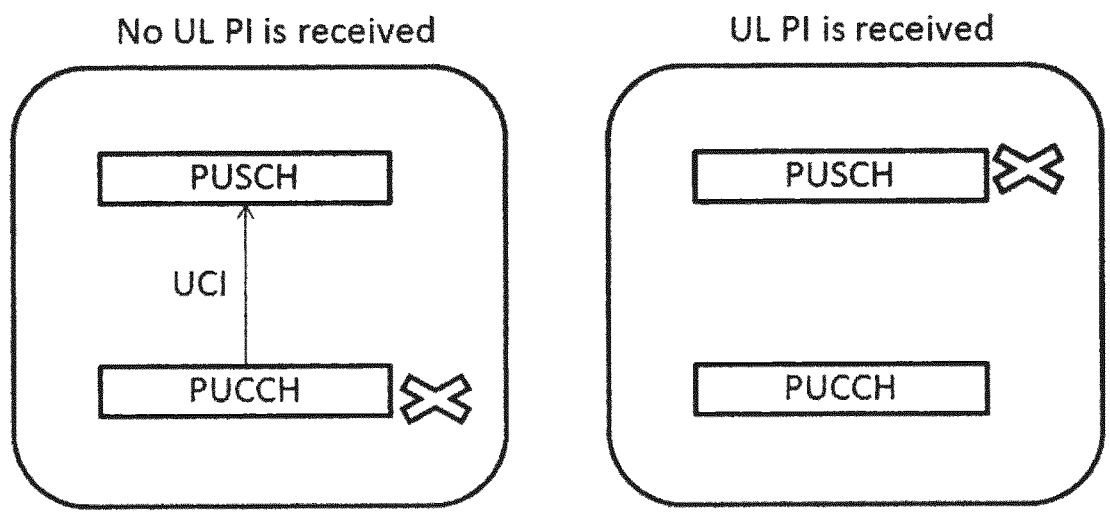
FIG. 6 depicts examples of using uplink shared and dedicated control channels for transmitting a previously interrupted transmission.

UE1 transmits the HARQ-ACK information on PUCCH in slot N. In this Example, it is assumed that the UE1 has not started to transmit its PUSCH when it receives an interrupt indication and still has enough time to switch back to transmit the HARQ-ACK on PUCCH in slot N. As shown in FIG. 6, in case the UE1 does not receive an interrupt indication, the UE1 would transmit the HARQ-ACK on PUSCH. Otherwise, if the UE1 receives an interrupt indication, the UE1 would transmit the HARQ-ACK on PUCCH.

Further, when the time-frequency resource indicated by the interrupt indication information (UL PI) conflicts with the PUSCH transmission of the UE1 in slot N, but does not collide with the PUCCH originally used for carrying the HARQ-ACK in slot N, the UE1 cancels the PUSCH transmission and then transmits the HARQ-ACK on the said PUCCH.

When the time-frequency resource indicated by the interrupt indication information (UL PI) conflicts with the PUSCH transmission of the UE1 in slot N, and also conflicts with the PUCCH originally used for carrying the HARQ-ACK in slot N, the UE1 cancels the PUSCH transmission and then transmit the HARQ-ACK on a predefined PUCCH. The predefined PUCCH resource can be determined in the same way as provided in Example 1-5, and is not repeated here.

Embodiment Example 2

Figure 7:
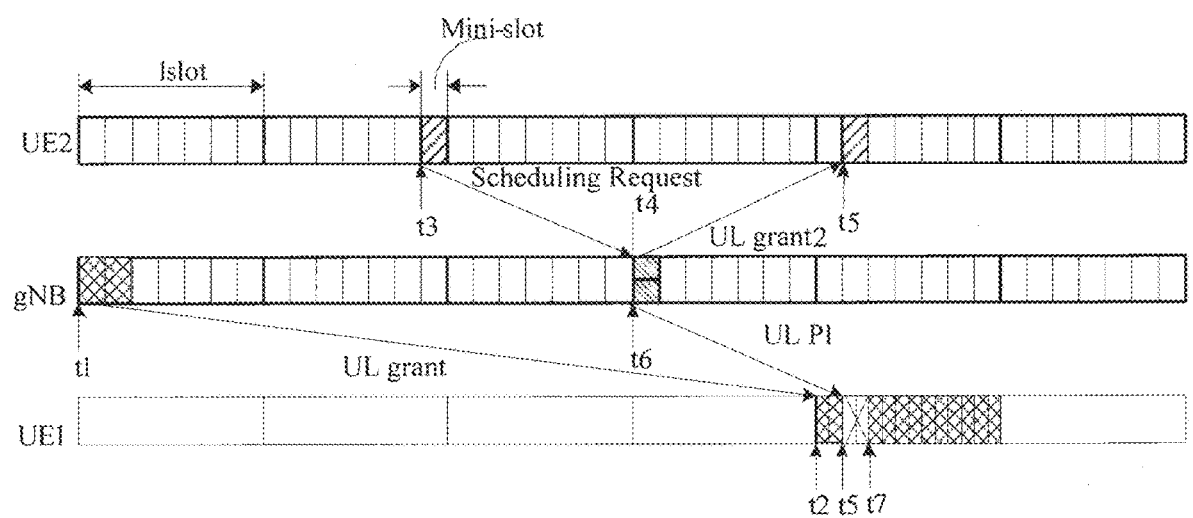
FIG. 7 depicts an example of a timeline of message transmissions.

As shown in FIG. 7, the base station (gNB) sends an uplink grant (UL grant1) to the UE1 at time t1, and is configured to schedule the UE1 to perform physical uplink shared channel (PUSCH) transmission at time t2, where the PUSCH transmitted at time t2 includes HARQ-ACK information corresponding to the physical downlink shared channel (PDSCH).

Meanwhile, UE2 sends a scheduling request (SR) for the uplink transmission to the base station at time t3>t1, and the base station transmits an uplink grant (UL grant2) to the UE2 at time t4>t3. UL grant2 is schedules the UE2 to perform physical uplink shared channel transmission at time t5. The PUSCH of the UE2 may comprise a mini-slot, and overlap with the PUSCH of UE1 in frequency domain, and the overlap includes partial overlap or complete overlap.

The base station transmits an indication of "interrupt" transmission to UE1 at time t6 (where t6 is not earlier than t3), instructing UE1 to "interrupt" transmission no later than t5. The "interrupt" transmission is that the UE1 stops the transmission only on the symbols which are overlapped with the UE2 in frequency domain, that is, as an example in FIG. 7, the transmission between the time t5 and the time t7, and then resumes the transmission from the time t7.

After the UE1 interrupts the transmission, if the interrupted transmission contains the HARQ-ACK information corresponding to the PDSCH, in order to reduce the impact on the PDSCH transmission as much as possible, the UE1 may use one of the following ways by which the dropped HARQ-ACK information is retransmitted.

Embodiment Example 2-1

Figure 8:
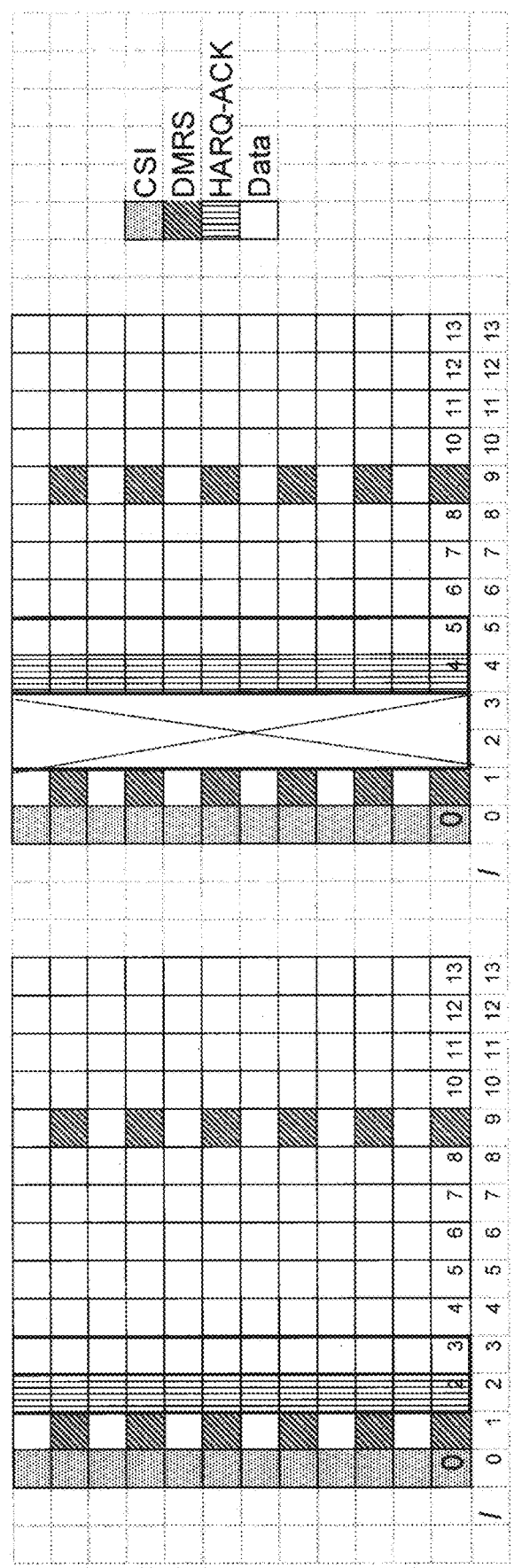
FIG. 8 depicts an example of transmission resources used for transmission of a pre-empted transmission.

When the HARQ-ACK is included in the symbol 2 transmitted by the PUSCH, the UE1 transmits the HARQ-ACK on the symbol after the overlapping area, and the transmission on the other symbols remains unchanged, as shown in FIG. 8. As depicted, while HARQ-ACK was transmitted in symbol 2 on the subframe on left, the HARQ-ACK was transmitted on symbol 4 in the next subframe. Here, symbol 4 corresponds to a first available symbol after the interrupted symbols.

Embodiment Example 2-2

Figure 9A:
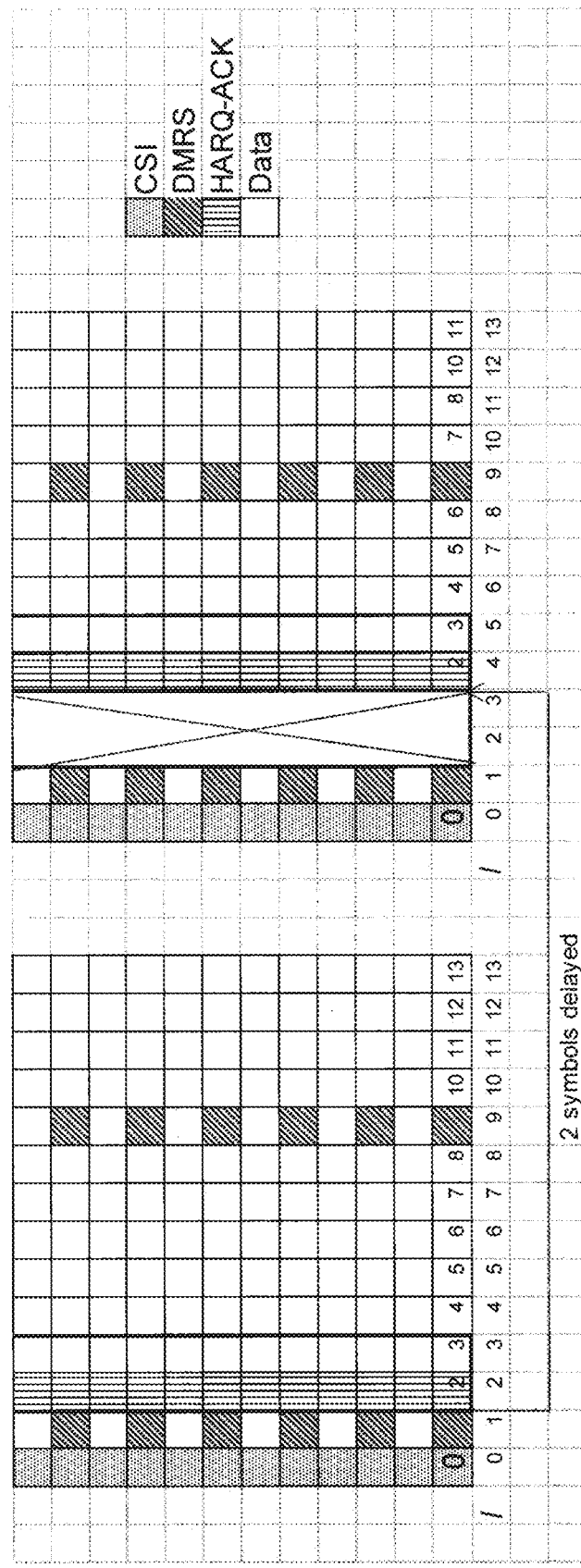
FIG. 9A depicts another example of transmission resources used for transmission of a pre-empted transmission.
Figure 9B:
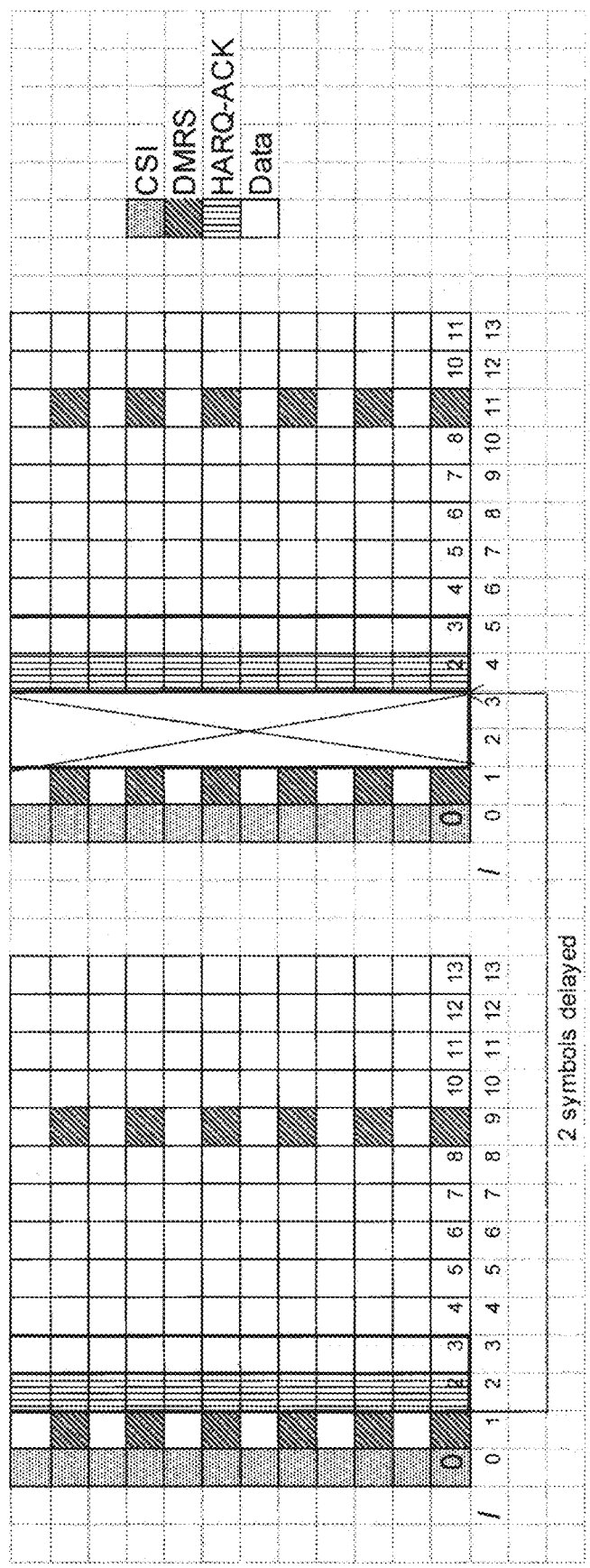
FIG. 9B depicts another example of transmission resources used for transmission of a pre-empted transmission.

When the overlapping area contains the symbol(s) in which the HARQ-ACK is located, the overlapping area and all subsequent symbols are delayed after being transmitted to the overlapping area. As shown in FIGS. 9A and 9B, the symbols 2 and 3 are overlapping symbols. The previously-preempted HARQ-ACK is transmitted on symbol 4, and the remaining transmissions are performed thereafter. The transmission method is equivalent to destroying the transmission behind the PUSCH. The symbol position where the demodulation reference signal (DMRS) is located is unchanged (FIG. 9A) or also delayed together with data transmissions (FIG. 9B).

In the various embodiment examples described above, combining may refer to one of several different ways of including information together. For example, concatenation may be used for combining. Using concatenation the bit sequence of HARQ-ACK multiplexed in PUSCH-1 is "a0, a1,a2,a3", and "b0,b1,b2,b3" in PUSCH-2 respectively. These two bit sequences may be concatenated to form a new bit sequence as "a0,a1,a2,a3,b0,b1,b2,b3".

Some example embodiments may be described using the following clauses.

Clause 1. An uplink control information transmission method includes steps of:

Terminal receives interrupt indication information, terminal interrupts a PUSCH transmission. In the cases that this interrupted PUSCH transmission contains uplink control information, the uplink control information is sent on symbol(s) after the interruption, or the uplink control information is sent on a PUCCH or PUSCH in a slot after or within the interruption occurs. The symbol(s) after interruption may be the immediate next symbol or may be another symbol.

Clause 2. In accordance with the method described in Clause 1, the terminal interrupts the PUSCH transmission after receiving the interrupt indication information, wherein the interrupting PUSCH transmission includes: interrupts the transmission of the symbol(s) on the overlapping area, or interrupts the PUSCH transmission from the starting symbol corresponding to the overlapping area.

Clause 3. In accordance with the method described in Clause 2, the uplink control information is sent on the PUCCH or PUSCH in the slot after or within the interruption occurs, when the interruption is to interrupt a PUSCH transmission from the starting symbol corresponding to the overlapping area. Some possible implementations are described with Examples listed under Example 1.

Clause 4. In accordance with the method described in Clause 3, wherein the PUSCH in the slot after or within the interruption occurs is at least one of the following:

The PUSCH that has been scheduled in the next slot after the interruption; (e.g., example embodiment 1-1).

A retransmission of the interrupted PUSCH that transmitted in the next slot after the interruption; (e.g., example embodiment 1-2).

A retransmission of the interrupted PUSCH scheduled by a new uplink grant; (e.g., example embodiment 1-4).

Clause 5. In accordance with the method described in clause 3, wherein the PUCCH in the slot after or within the interruption is at least one of the following: the PUCCH in the next slot after the interruption (e.g., example embodiment 1-5), or the PUCCH for sending the uplink control information in the slot where the interruption occurs.

Clause 6. The method according to Clause 3, wherein the uplink control information is sent on the PUSCH in the slot within or after the interruption occurs, and further includes: (e.g., example embodiment 1-3).

In case that the terminal schedules a PUSCH to be transmitted in the next slot after the interruption, the terminal sends the uplink control information on the said PUSCH in the next slot;

Otherwise, the terminal retransmits the PUSCH on the same time-frequency resource as the interrupted PUSCH in the next slot.

Clause 7. The method according to Clause 3, wherein the uplink control information is sent on the PUCCH or PUSCH in the slot within or after the interruption occurs, and further includes: (e.g., Embodiment 1-6).

In case that the terminal schedules a PUSCH to be transmitted in the next slot after the interruption, the terminal sends the uplink control information on the PUSCH in the next slot;

In case that the terminal does not transmit a PUSCH in the next slot after the interruption but has a PUCCH to transmit, the terminal sends the uplink control information on the PUCCH in the next slot.

Otherwise, the terminal sends the uplink control information on a predefined PUCCH in the next slot.

Clause 8. The method according to Clause 3, wherein the uplink control information is sent on the PUCCH in the slot within the interruption occurs, and further includes: (e.g., Embodiment 1-6).

In case that the PUCCH for transmitting the uplink control information does not collide with the time-frequency resource indicated by the interrupt indication information, the terminal sends the uplink control information on the said PUCCH.

Otherwise, the terminal sends the uplink control information on a predefined PUCCH.

Clause 9. The method according to Clause 7 or 8, wherein the predefined PUCCH is determined according to at least one of the following:

Determined according to a PRI (PUCCH Resource Indicator) control field in a DCI of a PDSCH corresponding to the HARQ-ACK.

The PUCCH is a dedicated PUCCH resource configured by higher layer.

The PUCCH resource is determined explicitly or implicitly according to the interrupt indication information. When it is an explicit indication, the PUCCH is determined based on the PRI control field contained in the interrupt indication information; when it is an implicit indication, the PUCCH is determined based on combination of an index of the first CCE (control channel element) for the PDCCH carrying the interrupt indication and an index for the UE1 to find its corresponding interrupt indication in the DCI (Downlink Control Information).

Clause 10. The method of Clause 2, wherein the uplink control information is transmitted on the symbol(s) after the interruption when the interruption is to interrupt transmission on symbol(s) corresponding to the overlap region. (e.g., Embodiment 2).

Clause 11. The method according to Clause 1, wherein the uplink control information includes but is not limited to: HARQ-ACK, or periodic CSI.

Clause 12. The method according to Clause 2, when the PUSCH has at least a demodulation reference signal symbol after the overlapped time-frequency resource indicated by the interrupt indication information, the interruption is to interrupt a transmission on symbol(s) corresponding to the interrupt overlap region. Otherwise, the interruption is to interrupt the PUSCH transmission after the start symbol corresponding to the overlap region.

In the various clauses above, candidate channels for transmitting uplink control information include:

(1) The PUCCH of the current slot (since the PUSCH is to be transmitted in the current slot, the PUCCH and the PUSCH cannot be transmitted simultaneously according to the existing NR rule, but if the PUSCH is interrupted, then the PUCCH in the current slot originally used for UCI transmission is reconsidered).

(2) The already scheduled PUSCH in the next slot (3) PUSCH retransmitted in the next slot (4) Rescheduled PUSCH (5) PUCCH of the next slot (6) predefined PUCCH According to some predefined priority principles, the corresponding PUCCH/PUSCH channel is selected to send uplink control information.

Figure 12:
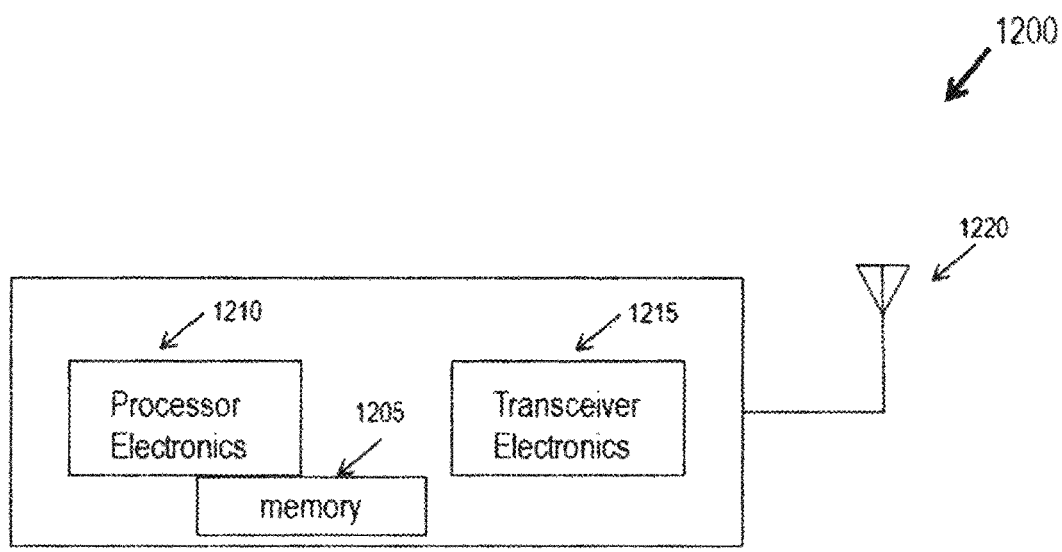
FIG. 12 is a block diagram of an example implementation of a wireless communication apparatus.

FIG. 12 depicts a block diagram representing of a portion of a radio station 1205. A radio station 1205 such as a base station or a wireless device (or UE) can include processor electronics 1210 such as a microprocessor that implements one or more of the wireless techniques presented in this document. The radio station 1205 can include transceiver electronics 1215 to send and/or receive wireless signals over one or more communication interfaces such as antenna 1220. The radio station 1205 can include other communication interfaces for transmitting and receiving data. Radio station 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the radio station 1205.

Figure 13:
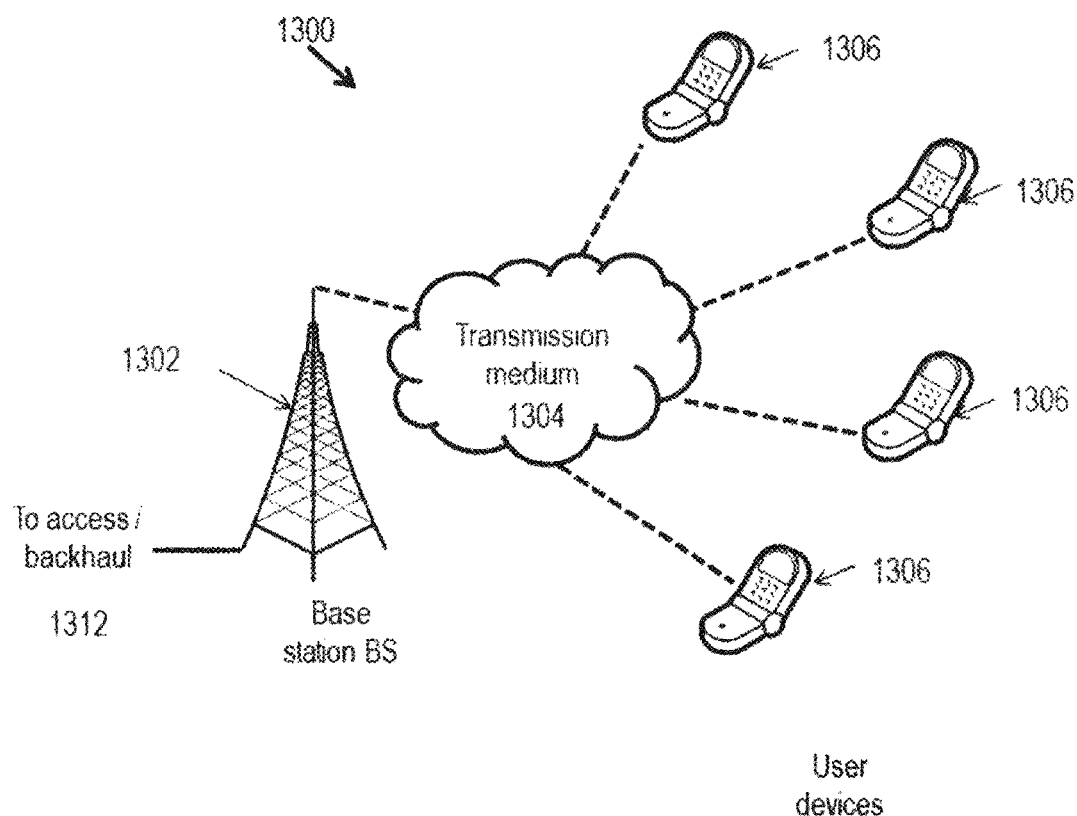
FIG. 13 shows an example of a wireless communication network.

FIG. 13 shows an example wireless communications network 1300. The network 1300 includes a base station BS 1302 and multiple user devices 1306 being able to communicate with each other over a transmission medium 1304. The transmissions from the BS 1302 to the devices 1306 are generally called downlink or downstream transmissions.

The transmissions from the devices 1306 to the BS 1302 are generally called uplink or upstream transmissions. The transmission medium 1304 typically is wireless (air) medium. The BS 1302 may also be communicatively coupled with other base stations or other equipment in the network via a backhaul or an access network connection 1312.

It will be appreciated that the present document discloses techniques that can be embodied into wireless communication systems to enable the use of pre-emption of lower priority services in favor of higher priority services. Various embodiments have been disclosed to allow for eventual actual transmission of certain messages that got pre-empted or interrupted. These messages may include HARQ-ACK or CSI messages that enable ongoing robust operation of a wireless communication link between a user equipment or terminal and the network.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   receiving, at a communication device, an interrupt indication indicating an interruption to occur on a first transmission resource;
   interrupting, based on the interrupt indication, a transmission scheduled to occur using a second transmission resource on a channel, wherein the first transmission resource and the second transmission resource at least partially overlap; and
   transmitting, in response to the interrupted transmission configured to include a control information, the control information using a third transmission resource,
      wherein in response to a scheduled transmission of a shared channel being in a next slot, the third transmission resource corresponds to a resource of that scheduled transmission, and wherein in response to no scheduled transmission of the shared channel being in the next slot, the third transmission resource corresponds to a resource of retransmission of the interrupted transmission that occurs in an immediate next slot after the interruption.

2. The method of claim 1, further comprising:

in response to the scheduled transmission of the shared channel being absent in the next slot, and a control channel is available in the next slot, the third transmission resource corresponds to the resource of that control channel; and otherwise, the third transmission resource corresponds to the resource of a predefined control channel in the next slot.

3. The method of claim 1, wherein the control information includes a hybrid automatic repeat request acknowledgement (HARQ-ACK) or a periodic channel state information.

4. The method of claim 1, wherein the channel is a physical uplink shared channel or a physical uplink control channel, and wherein the third transmission resource corresponds to a resource of a physical uplink shared channel or a physical uplink control channel.

5. A wireless communication apparatus, comprising a processor configured to implement a method, comprising:

receive an interrupt indication indicating an interruption to occur on a first transmission resource;

interrupt, based on the interrupt indication, a transmission scheduled to occur using a second transmission resource on a channel, wherein the first transmission resource and the second transmission resource at least partially overlap; and transmit, in response to the interrupted transmission configured to include a control information, the control information using a third transmission resource, wherein in response to a scheduled transmission of a shared channel being in a next slot, the third transmission resource corresponds to a resource of that scheduled transmission, and wherein in response to no scheduled transmission of the shared channel being in the next slot, the third transmission resource corresponds to a resource of retransmission of the interrupted transmission that occurs in an immediate next slot after the interruption.

6. The wireless communication apparatus of claim 5, wherein the processor is further configured to:

in response to the scheduled transmission of the shared channel being absent in the next slot, and a control channel is available in the next slot, the third transmission resource corresponds to the resource of that control channel; and otherwise, the third transmission resource corresponds to the resource of a predefined control channel in the next slot.

7. The wireless communication apparatus of claim 5, wherein the control information includes a hybrid automatic repeat request acknowledgement (HARQ-ACK) or a periodic channel state information.

8. The wireless communication apparatus of claim 5, wherein the channel is a physical uplink shared channel or a physical uplink control channel, and wherein the third transmission resource corresponds to a resource of a physical uplink shared channel or a physical uplink control channel.

9. A non-transitory computer program product having code stored thereon, the code, when executed by a processor, causing the processor to implement a method, comprising:

receiving, at a communication device, an interrupt indication indicating an interruption to occur on a first transmission resource;

interrupting, based on the interrupt indication, a transmission scheduled to occur using a second transmission resource on a channel, wherein the first transmission resource and the second transmission resource at least partially overlap; and transmitting, in response to the interrupted transmission configured to include a control information, the control information using a third transmission resource, wherein in response to a scheduled transmission of a shared channel being in a next slot, the third transmission resource corresponds to a resource of that scheduled transmission, and wherein in response to no scheduled transmission of the shared channel being in the next slot, the third transmission resource corresponds to a resource of retransmission of the interrupted transmission that occurs in an immediate next slot after the interruption.

10. The non-transitory computer program product of claim 9, wherein the method further comprises:

in response to the scheduled transmission of the shared channel being absent in the next slot, and a control channel is available in the next slot, the third transmission resource corresponds to the resource of that control channel; and otherwise, the third transmission resource corresponds to the resource of a predefined control channel in the next slot.

11. The non-transitory computer program product of claim 9, wherein the control information includes a hybrid automatic repeat request acknowledgement (HARQ-ACK) or a periodic channel state information.

12. The non-transitory computer program product of claim 9, wherein the channel is a physical uplink shared channel or a physical uplink control channel, and wherein the third transmission resource corresponds to a resource of a physical uplink shared channel or a physical uplink control channel.

\* \* \* \* \*